United States Patent [19]

Tempel

[11] Patent Number: 5,647,701
[45] Date of Patent: Jul. 15, 1997

[54] MULTIPLE SPINDLE SCREW MACHINE BOX TOOL INSERT HOLDER

[76] Inventor: Daryl K. Tempel, 111 Marcia Dr., Freeport, Ill. 61032

[21] Appl. No.: 571,531

[22] Filed: Dec. 13, 1995

[51] Int. Cl.$^6$ .................................. B23C 5/22
[52] U.S. Cl. .................. 407/113; 407/103; 407/67
[58] Field of Search ............... 407/67, 103, 104, 407/113

[56] References Cited

U.S. PATENT DOCUMENTS

| | | | |
|---|---|---|---|
| 3,484,920 | 12/1969 | Werner | 407/113 X |
| 3,499,198 | 3/1970 | Pollard et al. | 407/104 |
| 3,925,868 | 12/1975 | Singh | 407/104 |
| 3,996,651 | 12/1976 | Heaton et al. | |
| 4,011,049 | 3/1977 | McCreery | |
| 4,083,644 | 4/1978 | Friedline | |
| 4,315,706 | 2/1982 | Erkfritz | |
| 4,533,283 | 8/1985 | Satran et al. | 407/104 X |
| 4,557,639 | 12/1985 | Fischer | 407/113 X |
| 4,636,117 | 1/1987 | Shikata | 407/104 |
| 4,640,159 | 2/1987 | Stojanovski | |
| 4,692,070 | 9/1987 | Shikata | 407/104 |
| 4,695,208 | 9/1987 | Yankoff | |
| 4,869,624 | 9/1989 | Viellet | 407/104 |
| 4,875,812 | 10/1989 | Haque et al. | 407/104 |
| 4,876,932 | 10/1989 | Nessel | |
| 4,992,007 | 2/1991 | Satran | |
| 5,004,378 | 4/1991 | Arai et al. | 407/104 X |
| 5,112,163 | 5/1992 | Veilleux | |

FOREIGN PATENT DOCUMENTS

| | | | |
|---|---|---|---|
| 2580531 | 10/1986 | France | 407/67 |
| 1532238 | 11/1978 | United Kingdom | 407/104 |

*Primary Examiner*—Daniel W. Howell
*Assistant Examiner*—Henry W. H. Tsai
*Attorney, Agent, or Firm*—Russell D. Slifer

[57] ABSTRACT

A multiple spindle screw machine box tool insert holder, the box tool insert holder comprising: a shank member having a generally elongated parallel sided configuration including top and bottom elongated surfaces, and left and right elongated surfaces, the shank member also having from and rear opposing end surfaces; and an insert receiving pocket. The insert receiving pocket is positioned on the front end surface of the shank member. The insert receiving pocket is comprised of a bottom wall and three side walls for seating an insert therein. The insert has a central hole located therein. The side walls have a height less than a height of the insert. The insert receiving pocket has a threaded hole formed downwardly through the bottom wall. The threaded hole is non-concentric relative to a longitudinal central axis through the box tool insert holder, whereby when the insert is seated in the pocket a threaded pin member having a head on one end is adapted to engage the insert from above while the threaded pin member extends downwardly through the central hole in the insert and into the threaded hole in the bottom wall in threaded engagement, thereby securely holding the insert securely in place.

16 Claims, 3 Drawing Sheets

MULTIPLE SPINDLE SCREW MACHINE BOX TOOL INSERT HOLDER

BACKGROUND OF THE INVENTION

1. Field of the Invention

The present invention relates generally to a box tool insert holder, and more particularly to a box tool insert holder for use with a multiple spindle screw machine.

2. Description of the Prior Art

In performing heavy turning operations on screw machines, such as turning stock off or shaving material off, cutting tools are naturally subjected to considerable wear and abuse and require frequent grinding or replacement. Thus, it is often difficult for an operator to quickly replace or grind a worn cutting tool. Grinding and re-grinding a worn cutting tool takes a considerable amount of time and slows down the time for performing turning operations. Additionally, a considerable amount of time is also used when replacing the cutting tool back into the screw machine. The operator is required to re-center and re-set the cutting tool within the screw machine before beginning further cutting operations.

The various different cutting tools used with multiple spindle screw machines typically last for only 3-4 hours of use and are only good for approximately 300-400 parts. These cutting tools include triangular shaped inserts and brazed box type turning tools.

Triangular inserts in the industry have a smaller construction and do not last very long in performing turning operations. Brazed box type turning tools can be costly and require an operator to grind the worn tool as well as re-setting the tool back into the multiple spindle screw machine, thereby adding considerable time in the production of parts.

These and other types of box tool insert holders disclosed in the prior art do not offer the flexibility and inventive features of my box tool insert holder for use with multiple spindle screw machines. As will be described in greater detail hereinafter, the box tool insert holder of the present invention differs from those previously proposed.

It is therefore an object of the present invention to provide a quick change type of tool holder for use with multiple spindle screw machines that is simple in operation and solidly constructed.

It is a further object of the present invention to provide a cost effective quick change type tool holder that does not require indexing or re-centering of the tool bit and that also lasts longer than convention box tools.

SUMMARY OF THE INVENTION

According to my present invention I have provided a multiple spindle screw machine box tool insert holder, the box tool insert holder comprises: a shank member that has a generally elongated parallel sided configuration including top and bottom elongated surfaces, and left and right elongated surfaces, the shank member also has front and rear opposing end surfaces; and an insert receiving pocket, the insert receiving pocket is positioned on the front end surface of the shank member, the insert receiving pocket is comprised of a bottom wall and three side walls for seating an insert therein, the insert has a central hole located therein, the side walls have a height less than a height of the insert, the insert receiving pocket has a threaded hole formed downwardly through the bottom wall, the threaded hole is non-concentric relative to a longitudinal central axis through the box tool insert holder, whereby when the insert is seated in the pocket a threaded pin member that has a head on one end is adapted to engage the insert from above while the threaded pin member extends downwardly through the central hole in the insert and into the threaded hole in the bottom wall in threaded engagement, thereby securely holding the insert securely in place.

Another feature of my invention relates to my multiple spindle screw machine box tool insert holder described above wherein the side walls are configured to accept a diamond shaped insert.

Still another feature of my invention concerns the multiple spindle screw machine box tool insert holder described above wherein inner corners of the side walls have relief notches located therein for providing additional clearance for corners of the insert.

According to important features of my invention I have also provided a multiple spindle screw machine box tool insert holder as described above wherein an upper portion of the shank member has an enlarged parallel sided head, the enlarged parallel side head has a pair of undercut faces each positioned in right angular relation relative to an adjacent one of the elongated surfaces, thereby enabling a lower portion of the shank member to be held in a multiple spindle screw machine that can only hold smaller sized shanks.

Yet another feature of my invention I have provided a multiple spindle screw machine box tool insert holder as described above wherein the insert receiving pocket is also positioned on the rear end surface of the shank member, thereby providing a box tool insert holder on both ends of the shank member.

Still further features of my invention I have provided a multiple spindle screw machine box tool insert holder as described above wherein the insert can be rotated or replaced while the box tool insert holder is held in place in a multiple spindle screw machine, thereby providing a quick and easy rotation or change of inserts without having to re-center the box tool insert holder within the multiple spindle screw machine.

Other objects, features and advantages of my invention will become more readily apparent upon reference to the following description when taken in conjunction with the accompanying drawings, which drawings illustrate several embodiments of my invention.

DETAILED DESCRIPTION OF THE PREFERRED EMBODIMENT

Figure 1:
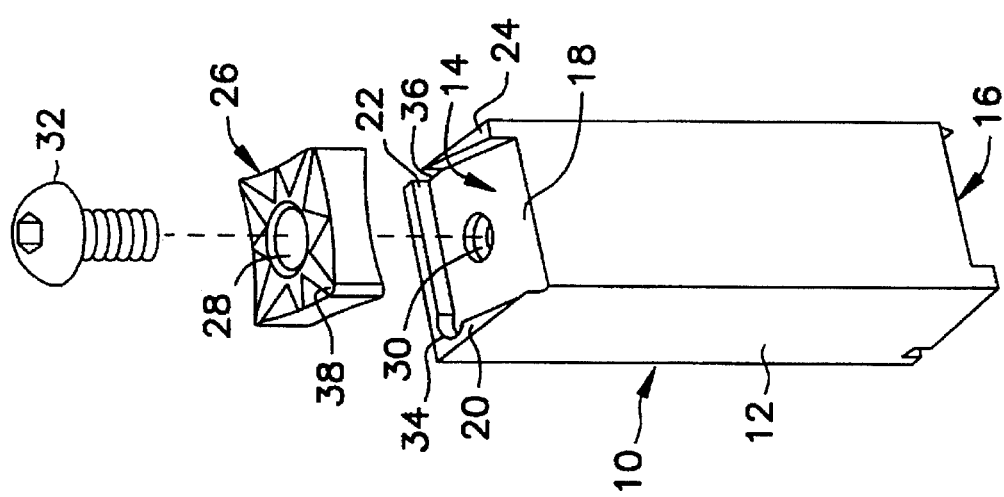
FIG. 1 is an exploded perspective view of my multiple spindle screw machine box tool insert holder embodying important features of my invention.

Referring now to the drawings, FIG. 1 shows my new and improved box tool insert holder 10 for use with multiple spindle screw machines. The box tool insert holder 10 comprises a rectangular shaped steel shaft 12 typically having a square cross-section. The multiple spindle screw machine box tool insert holder is mounted within a multiple spindle screw machine. More specifically, the box tool insert holder is mounted on a holder or a roller turner (FIG. 7) within a multiple spindle screw machine. Excellent results can be obtained when the shaft member is made with a 12L14 or 1018 grade steel.

The shank member 12 has a generally elongated parallel sided configuration with four sides and is generally square shaped. Roller turners for multiple spindle screw machines typically accept three different sized square shanks. These include shanks having a width of ½ inch, 9/16 inch and 5/8 inch. It is contemplated that the shank size can vary according to the size the multiple spindle screw machine accepts.

The shank member 12 also has front 14 and rear 16 opposing end surfaces. The shank further includes an insert receiving pocket positioned on the front end surface of the shank. The insert receiving pocket is comprised of a bottom wall 18 and three side walls 20, 22, 24. The pocket is sized to accept a cutting insert 26, and is more particularly sized to accept a diamond shaped cutting insert. The cutting insert 26 has a central hole 28 located therein for securement to the front end of the shank member 12 within the insert receiving pocket. Excellent results can be obtained when the side walls of the pocket are about half the height of the cutting insert.

The shank member 12 further has a threaded hole 30 formed downwardly through the bottom wall 18. The threaded hole 30 is non-concentric relative to a longitudinal central axis through the multiple spindle screw machine box tool insert holder 12. The side walls are sized such that when the insert is placed into the pocket then the three side walls are in parallel relationship to an adjoining side of the cutting insert 26. The insert 26 is then tightly fastened to the insert holder 12 with a threaded pin or a screw 32. The screw 32 is long enough to enable the insert 26 to be rotated within the holder without removing the screw, whereby the screw 32 can be loosened and the insert can be lifted from the pocket above the height of the side walls and then rotated 180 degrees. A diamond shaped insert manufactured by Carboloy Inc. located in Detroit, MI., U.S.A., a SECO Tools Company, having one of the following part numbers provides excellent results: 1) order number CNMP 432-MF1, ISO number CNMG 120408; 2) order number CNMP 433-M1, ISO number CNMG 120412. It is contemplated that other various inserts and diamond shaped inserts could be used with my multiple spindle screw machine box tool insert holder, however, the walls within the receiving pocket must be sized to accept different sized inserts.

The insert receiving pocket is also provided with relief notches 34, 36 to provide additional clearance for the corners of the cutting insert, thereby making it easier to insert and replace within the holder. Additionally, the corners of the insert may require additional space if that particular cutting edge corner of the insert has been worn down or has "mushroomed" over. Excellent results are obtained when the cutting edge 38 on the insert 26 is aligned parallel to the edge of the holder 12. The cutting edge 38 can also slightly overlap over the edge or be slightly within the edge of the edge of the holder, however, best results have been observed when the cutting edge is parallel to the edge of the holder. When the box tool insert holder 10 is securely held in place within a multiple spindle screw machine, the cutting edge 38 is aligned to be "on center" with the raw material that is being cut.

In the event that the pocket on my multiple spindle screw machine box tool insert holder becomes damaged due to improper use or highly extensive use, the box tool insert holder can also have a pocket located on the rear end 16 of the holder 12.

Figure 2:
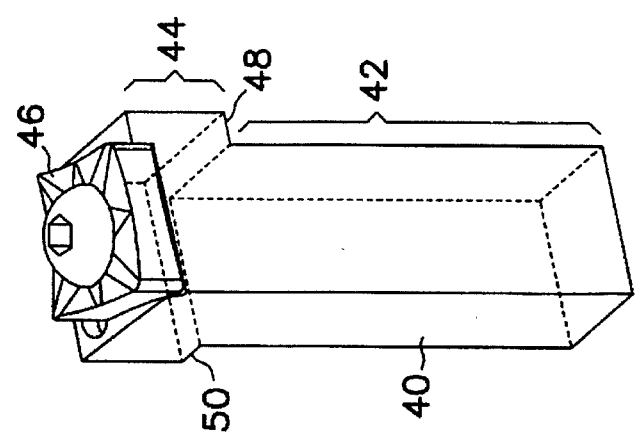
FIG. 2 is a perspective view of another embodiment of my multiple spindle screw machine box tool insert holder embodying further features of my invention.

FIG. 2 illustrates another embodiment of my invention wherein the shank 40 has a smaller cross-sectional size for use with multiple spindle screw machines that hold smaller sized shanks, such as ½ inch. The shank 40 has a lower portion 42 that is sized to be held within a multiple spindle screw machine. The shank also has an upper portion 44 that is enlarge to properly and securely hold an insert 46. The upper portion of the shank has an enlarged parallel sided head wherein a pair of undercut faces 48, 50 are positioned in right angular relation to an adjacent elongated surface.

Figure 3:
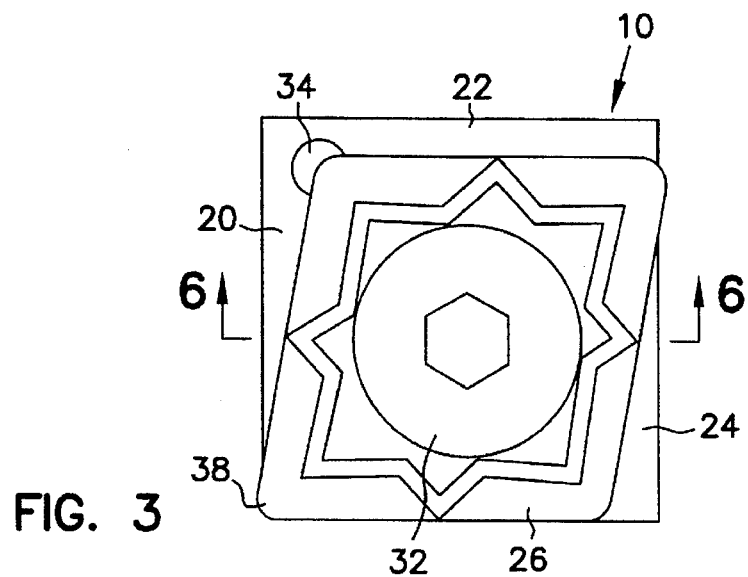
FIG. 3 is an enlarged top plan view of my multiple spindle screw machine box tool insert holder showing an insert fastened thereto.
Figure 4:
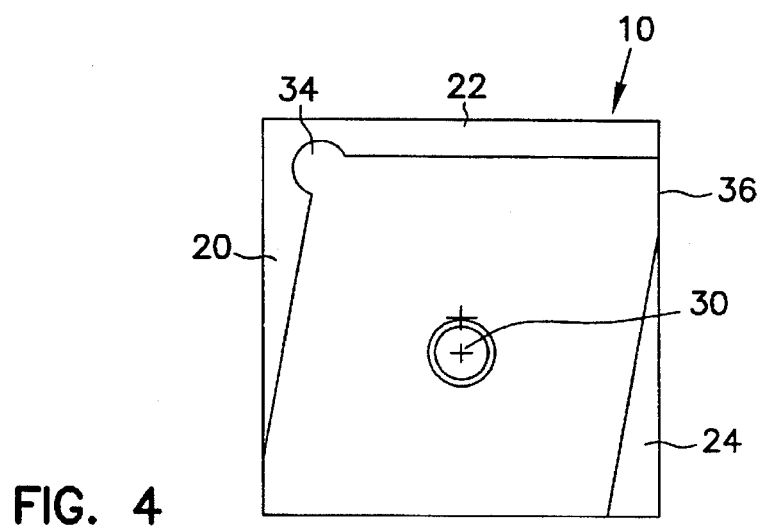
FIG. 4 is an enlarged top plan view of one configuration of my multiple spindle screw machine box tool insert holder without an insert attached.

FIGS. 3 and 4 illustrate a top view of my multiple spindle screw machine box tool insert holder 10 wherein the cutting insert 26 is secured in the threaded hole 30 with a screw 32. The threaded hole 30 is specifically aligned to hold the insert against the side walls of the receiving pocket. Since the insert 26 has a central hole located therein and the middle side wall 22 is necessary to provide proper stability of the insert within the holder, the threaded hole 30 is non-concentric relative to a longitudinal central axis through the holder 10. The three side walls 20, 22, 24 are positioned parallel to three sides of the insert. Additionally, the cutting edge 38 is located parallel to the side of the insert holder adjacent to edge 20.

Relief notches 34, 36 are positioned at the inner corners of the three side walls to provide quick and easy installation and removal of the insert. The first relief notch 34 has a semi-circular configuration. Excellent results are obtained when the relief notch has a ⅛ inch diameter. The second relief notch 36 provides a gap between the side walls 22, 24 to enable the cutting insert to properly fit.

Figure 5:
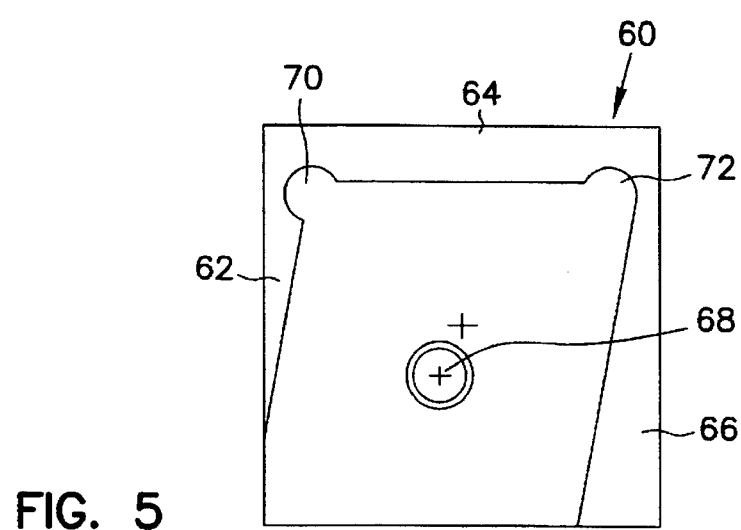
FIG. 5 is an enlarged top plan view of another configuration of my multiple spindle screw machine box tool insert holder without an insert attached.

On larger sized shanks, such as 5/8 inch, or on enlarged upper portion shanks (½ inch) the holder has a slightly different configuration due to the larger width (FIG. 5). The holder 60 still has three side walls 62, 64, 66, a threaded hole 68 for securing a cutting insert and a first relief notch 70, however, the second relief notch 72 does not extend beyond the side walls since the cutting insert can fully fit within the area of the shank.

Figure 6:
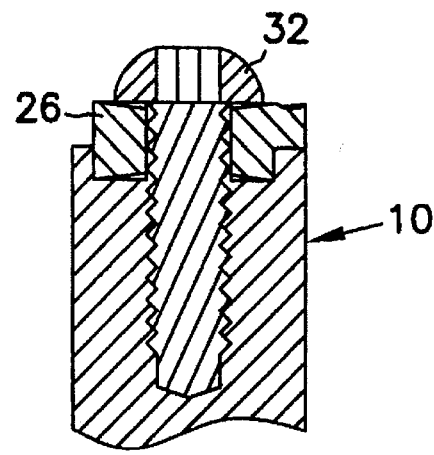
FIG. 6 is an enlarged partial cross-sectional side view taken along the lines 6—6 in FIG. 3 and looking in the direction indicated by the arrows illustrating how an insert is fastened to my multiple spindle screw machine box tool insert holder.

FIG. 6 further illustrates how a cutting insert 26 is securely held with a screw 32 within my multiple spindle screw machine box tool holder 10.

Figure 7:
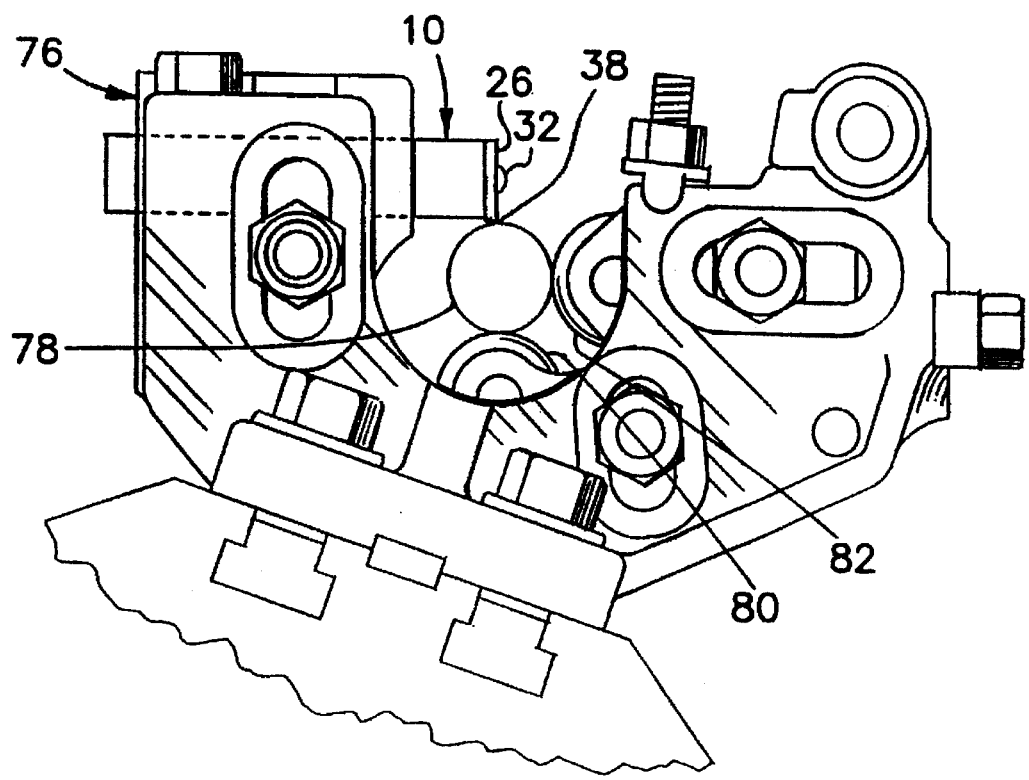
FIG. 7 is a side plan view illustrating the use of my multiple spindle screw machine box tool insert holder mounted on a roller turner that is used within a multiple spindle screw machine.

FIG. 7 illustrates the use of my multiple spindle screw machine box tool holder 10 wherein the box tool insert holder 10 is mounted on a roller turner 76. The cutting insert 26 is held securely in place with a screw 32. The roller turner holds a cylindrical part 78 in place between two rollers 80, 82 and the cutting edge of the insert. As the cylindrical part 78 is turned, the cutting edge 38 shaves material off of the part 78. The rollers 80, 82 help provide proper rotation of the part as material is being shaved off. After extensive use and wearing of the cutting insert 26, the cutting insert can then be removed or rotated from the box tool insert holder without removing or moving my box tool insert holder from the roller turner, thereby saving the time required for an operator to re-center the box tool insert holder within the roller turner. It is estimated that 10 minutes to 30 minutes can be saved each time the insert is replaced or rotated in my box tool insert holder. Additionally, the diamond shaped inserts last much longer than more expensive prior art devices. Therefore more parts can be manufactured at a lower cost using my multiple spindle screw machine box tool insert holder.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A multiple spindle screw machine box tool insert holder, the box tool insert holder comprising:
   a shank member having a generally elongated parallel sided configuration including top and bottom elongated surfaces, and left and right elongated surfaces, said shank member also having a front end surface; and
   an insert receiving pocket, said insert receiving pocket being positioned on the front end surface of the shank member, said insert receiving pocket comprised of a bottom wall substantially perpendicular to a longitudinal central axis through said shank member and three side walls for seating an insert therein, said insert having a central hole located therein, said side walls having a height less than a height of said insert, said insert receiving pocket having a threaded hole formed downwardly through said bottom wall, the threaded hold is non-concentric and substantially parallel to said longitudinal central axis through said box tool insert holder, whereby when said insert is seated in said pocket a threaded pin member having a head on one end is adapted to engage the insert from above while said threaded pin member extends downwardly through said central hole in said insert and into said threaded hole in said bottom wall in threaded engagement, thereby holding said insert securely in place.

2. The multiple spindle screw machine box tool insert holder of claim 1 wherein said side walls are configured to accept a diamond shaped insert.

3. The multiple spindle screw machine box tool insert holder of claim 1 wherein inner corners of said side walls have relief notches located therein for providing additional clearance for corners of the insert.

4. The multiple spindle screw machine box tool insert holder of claim 1 wherein an upper portion of said shank member has an enlarged parallel sided head, said enlarged parallel sided head having a pair of undercut faces each positioned in right angular relation relative to an adjacent one of said elongated surfaces, thereby enabling a lower portion of the shank member to be held in a multiple spindle screw machine that can only hold smaller sized shanks.

5. The multiple spindle screw machine box tool insert holder of claim 1 wherein a second insert receiving pocket is positioned on a rear end surface of the shank member, thereby providing a box tool insert holder on both ends of the shank member.

6. The multiple spindle screw machine box tool insert holder of claim 1 wherein said shank member has a square cross-section and has a width selected from the group consisting of: ½ inch, 9/16 inch and ⅝ inch.

7. In combination a multiple spindle screw machine box tool insert holder and a diamond shaped insert, the insert having a central hole located therein, said box tool insert holder comprising:
   a shank member having a generally elongated parallel sided configuration including top and bottom elongated surfaces, and left and right elongated surfaces, said shank member also having a front end surface; and
   an insert receiving pocket, said insert receiving pocket being positioned on the front end surface of the shank member, said insert receiving pocket comprised of a bottom wall substantially perpendicular to a longitudinal central axis through said shank member and three side walls for seating the diamond shaped insert therein, said side walls having a height less than a height of said insert, said insert receiving pocket having a threaded hole formed downwardly through said bottom wall, the threaded hole is non-concentric and substantially parallel to said longitudinal central axis through said box tool insert holder, whereby when said insert is seated in said pocket a threaded pin member having a head on one end is adapted to engage the insert from above while said threaded pin member extends downwardly through said central hole in said insert and into said threaded hole in said bottom wall in threaded engagement, thereby securely holding said insert securely in place.

8. The combination of claim 7 wherein inner corners of said side walls have relief notches located therein for providing additional clearance for corners of the insert.

9. The combination of claim 7 wherein an upper portion of said shank member has an enlarged parallel sided head, said enlarged parallel sided head having a pair of undercut faces each positioned in right angular relation relative to an adjacent one of said elongated surfaces, thereby enabling a lower portion of the shank member to be held in a multiple spindle screw machine that can only hold smaller sized shanks.

10. The combination of claim 7 wherein a second insert receiving pocket is also positioned on a rear end surface of the shank member, thereby providing a box tool insert holder on both ends of the shank member.

11. The combination of claim 7 wherein said shank member has a square cross-section and has a width selected from the group consisting of: ½ inch, 9/16 inch and ⅝ inch.

12. In a multiple spindle screw machine, the improvement of a box tool insert holder, the holder comprising:
   a shank member having a generally elongated parallel sided configuration, said shank member also having a front end surface;
   an insert receiving pocket, said insert receiving pocket being positioned on the front end surface of the shank member, said insert receiving pocket comprised of a bottom wall substantially perpendicular to a longitudinal central axis through said shank member and three side walls for seating a diamond shaped insert therein, said insert having a central hole located therein, said insert receiving pocket having a threaded hole formed downwardly through said bottom wall, the threaded hole is non-concentric and substantially parallel to said longitudinal central axis through said box tool insert holder; and a screw extended through said insert hole into said threaded hole joining said diamond shaped insert on the end of said holder in fixed assembly with said insert holder.

13. The multiple spindle screw machine of claim 12 wherein inner corners of said side walls have relief notches located therein for providing additional clearance for corners of the insert.

14. The multiple spindle screw machine of claim 13 wherein an upper portion of said shank member has an enlarged parallel sided head, said enlarged parallel sided head having a pair of undercut faces each positioned in right angular relation relative to an adjacent one of said elongated surfaces, thereby enabling a lower portion of the shank member to be held in a multiple spindle screw machine that can only hold smaller sized shanks.

15. The multiple spindle screw machine of claim 12 wherein a second insert receiving pocket is also positioned on a rear end surface of the shank member, thereby providing a box tool insert holder on both ends of the shank member.

16. The multiple spindle screw machine of claim 12 wherein said shank member has a square cross-section and has a width selected from the group consisting of: ½ inch, ⁹⁄₁₆ inch and ⅝ inch.

* * * * *